United States Patent
Ueno

[11] Patent Number: 5,728,343
[45] Date of Patent: Mar. 17, 1998

[54] METHOD OF MOLDING A RESIN PULLEY

[75] Inventor: Hiroshi Ueno, Osaka, Japan

[73] Assignee: Koyo Seiko Co., Ltd., Osaka, Japan

[21] Appl. No.: 560,499

[22] Filed: Nov. 17, 1995

[30] Foreign Application Priority Data

Nov. 18, 1994 [JP] Japan ................. 6-309576

[51] Int. Cl.$^6$ .................................... B29C 45/00
[52] U.S. Cl. ..................... 264/275; 264/276; 264/242
[58] Field of Search .................... 264/263, 242, 264/275, 276

[56] References Cited

U.S. PATENT DOCUMENTS

| | | |
|---|---|---|
| 3,990,136 | 11/1976 | Hishida .................. 264/263 |
| 4,580,757 | 4/1986 | Dobhan et al. . |
| 4,581,806 | 4/1986 | Minoshima .............. 264/263 |
| 4,654,181 | 3/1987 | Brandenstein et al. . |
| 4,668,209 | 5/1987 | Kyoosei et al. . |

FOREIGN PATENT DOCUMENTS

| | | |
|---|---|---|
| 1 301 211 | 12/1962 | France . |
| 2 554 041 | 5/1985 | France . |
| 2 572 988 | 5/1986 | France . |
| 34 20 584 | 11/1985 | Germany . |

Primary Examiner—Jan H. Silbaugh
Assistant Examiner—Edmund H. Lee
Attorney, Agent, or Firm—Reid & Priest LLP

[57] ABSTRACT

In a method of molding a resin pulley in which a rolling bearing is integrally fitted to the inner periphery of an annular resin body simultaneously with the molding of the resin body, a dummy boss shaft closes the inner periphery and a lateral side of the metallic member. With the cavity molds closed, an annular film gate is formed, by a flange of the dummy boss shaft and a cavity mold, in the vicinity of the outer peripheral edge of an end surface of the rolling bearing. The cavity is charged with molten resin through the film gate.

5 Claims, 6 Drawing Sheets

METHOD OF MOLDING A RESIN PULLEY

BACKGROUND OF THE INVENTION

The present invention relates to a method of molding a resin-covered article composed of an annular resin body and an annular metallic member integrally fitted to the inner periphery of the resin body, such as a guide roller in a delivery system, a resin pulley for guiding a belt or the like.

As a resin-covered article, for example, a belt guiding pulley such as a crank pulley for an automobile, there has conventionally been proposed a pulley comprising (i) an annular resin body (pulley body) provided on the outer periphery thereof with a belt guiding surface and (ii) a metallic member such as a rolling bearing, a metallic hub or the like integrally fitted to the inner periphery of the resin body.

Such a pulley is made by a so-called insert molding method in which a metallic member is integrally fitted to a resin body simultaneously with the molding of the resin body by injection molding. As a gate method in the injection molding, there is employed a side gate method or a pinpoint gate method excellent in productivity.

In the pulley above-mentioned, the inner portion is made of the metallic member and the outer peripheral portion is made of the resin body. Accordingly, when the ambient temperature varies with the pulley mounted on an automobile or the like, there is generated an internal stress in the resin body due to a difference in coefficient of thermal expansion between the metallic and the resin body. In the pinpoint gate method or the side gate method above-mentioned, such an internal stress is concentrated on the gate marks of the resin body. Thus, the gate mark portions are disadvantageously liable to be cracked.

Further, molten resin supplied in the cavity through the gates, is concentrically expanded around the gates. Thus, molten resins expanded after being supplied through two adjacent gates, interfere with each other at the interface of these molten resins. This prevents the molten resins from smoothly flowing. This results in formation, at the outer periphery of the pulley, of a ripple containing microscopic irregularities in number identical with the gate number (See FIG. 4). This fails to provide the pulley with a good roundness.

Dependent on a gate balance, an internal stress directed toward the pulley center is generated at the inner periphery of the resin body. Such an internal stress deteriorates the roundness of a rolling bearing as the metallic member or reduces the radial gap therein. This disadvantageously exerts adverse effects on the performance of the rolling bearing.

In view of the foregoing, it may be proposed to carry out a compression molding after the capacity of a resin body has previously been measured and an accurate amount of molten resin has been supplied into the cavity, or to carry out an injection molding in which the respective molding tools are individually charged with molten resin. However, either proposal is low in productivity to increase the cost and therefore cannot be put in practical use.

OBJECT AND SUMMARY OF THE INVENTION

It is an object of the present invention to provide a method of molding a resin-covered article which is hardly cracked in the resin body even though the ambient temperature varies while the resin-covered article is under use.

It is another object of the present invention to provide a method of molding a resin-covered article capable of enhancing the roundness of the outer periphery of the resin body.

It is a further object of the present invention to provide a method of molding a resin-covered article having no possibility of the resin body exerting adverse effects on the dimensional precision, performance or the like of the metallic member.

In carrying out our invention in one preferred mode, the present invention provides a method of molding a resin-covered article in which an annular metallic member is integrally fitted to the inner periphery of an annular resin body simultaneously with the molding of the resin body, and this method comprises the steps of: (i) fitting, to the inner periphery of a metallic member, the outer periphery of a shaft portion of a dummy boss shaft provided at one end of the shaft portion thereof with a flange having an outer diameter smaller than the outer diameter of the metallic member, and disposing a lateral side of the flange along an end surface of the metallic member; and (ii) charging a cavity with molten resin through an annular film gate which is formed, by the flange of the dummy boss shaft and a cavity mold, along and in the vicinity of the outer peripheral edge of the end surface of the metallic member, and of which outer diameter is smaller than the outer diameter of the metallic member.

According to the method of molding a resin-covered article above-mentioned, the cavity is charged with molten resin through the annular film gate formed along and in the vicinity of the outer peripheral edge of the end surface of the metallic member. Thus, the gate mark formed on the inner periphery of the resin body is annular. With variations of the ambient temperature of the resin-covered article under use, there is produced a difference in thermal expansion between the metallic member and the resin body, thereby to generate an internal stress in the resin body. According to the present invention, it is possible to prevent such an internal stress from intensively acting on the gate mark. This results in prevention of the occurrence of a crack at the gate mark portion.

Further, molten resin can uniformly be supplied into the cavity from the entire circumference of the resin body at the inner peripheral side thereof. Accordingly, the resin body can uniformly be formed with high precision in its entirety. In particular, since a ripple is not produced in the resin body as done in a conventional multi-point gate method, the resin body can be provided at the outer periphery thereof with good roundness.

According to the film gate method above-mentioned, it is possible to restrain the occurrence of a residual stress at the inner periphery of the resin body after molded. Therefore, no adverse effect may be exerted on the dimensional precision, performance and the like of the metallic member such as a rolling bearing.

In the method of molding a resin-covered article above-mentioned, the film gate is preferably formed in the vicinity of the end surface of the metallic member at the outer peripheral side thereof. According to this mode, the gate mark is put on the inner peripheral surface of the resin body at a position thereof in the vicinity of the end surface of the metallic member. More specifically, the gate mark is put at a position separated from the position where the metallic member and the resin body are relatively pressed due to a difference in thermal expansion between the metallic member and the resin body. This makes it difficult that an internal stress generated in the resin body due to thermal contraction of the resin body when used at a low temperature, acts on the gate mark. This results in effective prevention of the occurrence of a crack at the gate mark portion even though the ambient temperature is low and the resin body is remarkably thermally contracted.

Preferably, the film gate is formed at a position which is in the vicinity of the end surface of the metallic member at the outer peripheral side thereof and which corresponds to the smallest-inner-diameter portion of the inner periphery of the resin body. Such an arrangement prevents the molten resin from entering the contact portion where the flange of the dummy boss shaft and the end surface of the metallic member come in contact with each other. This enables the resin body to be molded in an accurate configuration. More specifically, if the film gate is formed at a position outside ("above" on FIG. 8) of the position which corresponds to the smallest-inner-diameter portion of the inner periphery of the resin body, this means that a step portion is formed at the outer periphery of the flange of the dummy boss shaft as shown in FIG. 8. Accordingly, the pressure of the molten resin entering the gap between the end surface of this step portion and the end surface of the metallic member, separates the flange from the end surface of the metallic member. This causes the molten resin to enter this gap, thus failing to form the resin body in an accurate configuration. On the other hand, when the film gate is formed at the position which corresponds to the smallest-inner-diameter portion of the inner periphery of the resin body, no step portion is formed at the outer periphery of the flange. Thus, there is no possibility of the flange being separated from the end surface of the metallic member by the pressure of the molten resin. Accordingly, the resin body can be formed in an accurate configuration.

Preferably, the axis of the dummy boss shaft is located on a virtual extension line of the axis of a spool and an injection molding nozzle. According to this mode above-mentioned, the molten resin can more uniformly be supplied into the cavity from the entire circumference of the film gate. This enables a resulting resin pulley to be more uniformly be formed with high precision.

Preferably, the molten resin is guided to the film gate along a spherical surface formed at the flange of the dummy boss shaft. According to this mode, the molten resin can be guided to the film gate very smoothly such that the molten resin can much more uniformly be supplied to the cavity. Thus, a resultant resin pulley can much more uniformly be formed with high precision.

DETAILED DESCRIPTION OF THE PREFERRED EMBODIMENTS

The following description will discuss in detail the present invention with reference to attached drawings showing preferred embodiments thereof.

Figure 2:
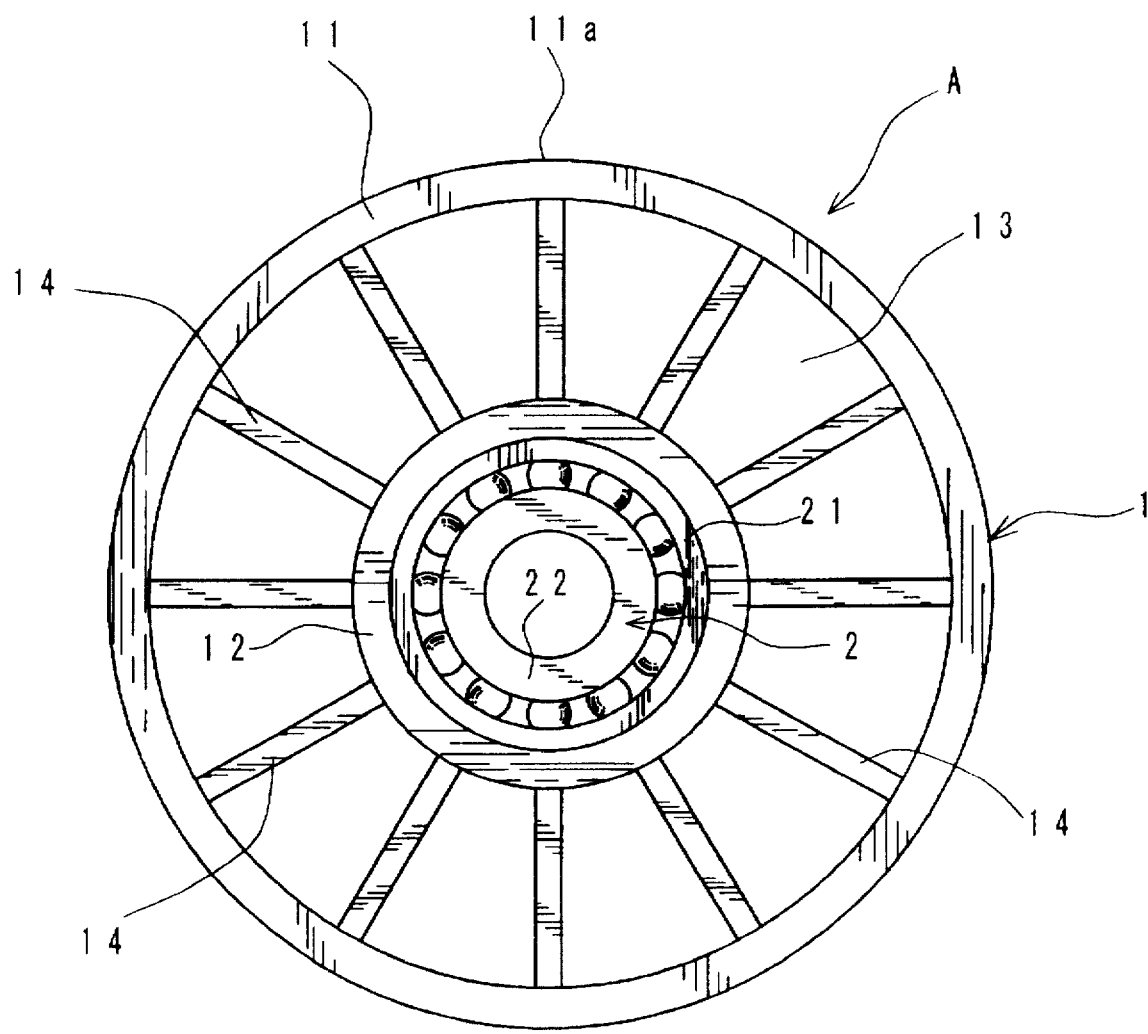
FIG. 2 is a front view of main portions of a resin pulley molded by applying the present invention.

FIG. 2 is a front view of main portions of a resin pulley A as a resin-covered article to which the present invention is applied. The resin pulley A comprises an annular resin body 1 and a rolling bearing 2 as a metallic member integrally fitted to the inner periphery of the resin body 1. The resin body 1 is provided at the outer peripheral side thereof with an outer peripheral cylindrical portion 11 which is provided at the outer periphery thereof with a belt guide surface 11a. The resin body 1 is provided at the inner peripheral side thereof with an inner peripheral cylindrical portion 12 to which is secured the outer periphery of an outer ring 21 of the rolling bearing 2. Formed between the outer peripheral cylindrical portion 11 and the inner peripheral cylindrical portion 12 is a circular plate 13 having a plurality of radially extending ribs 14.

Figure 1:
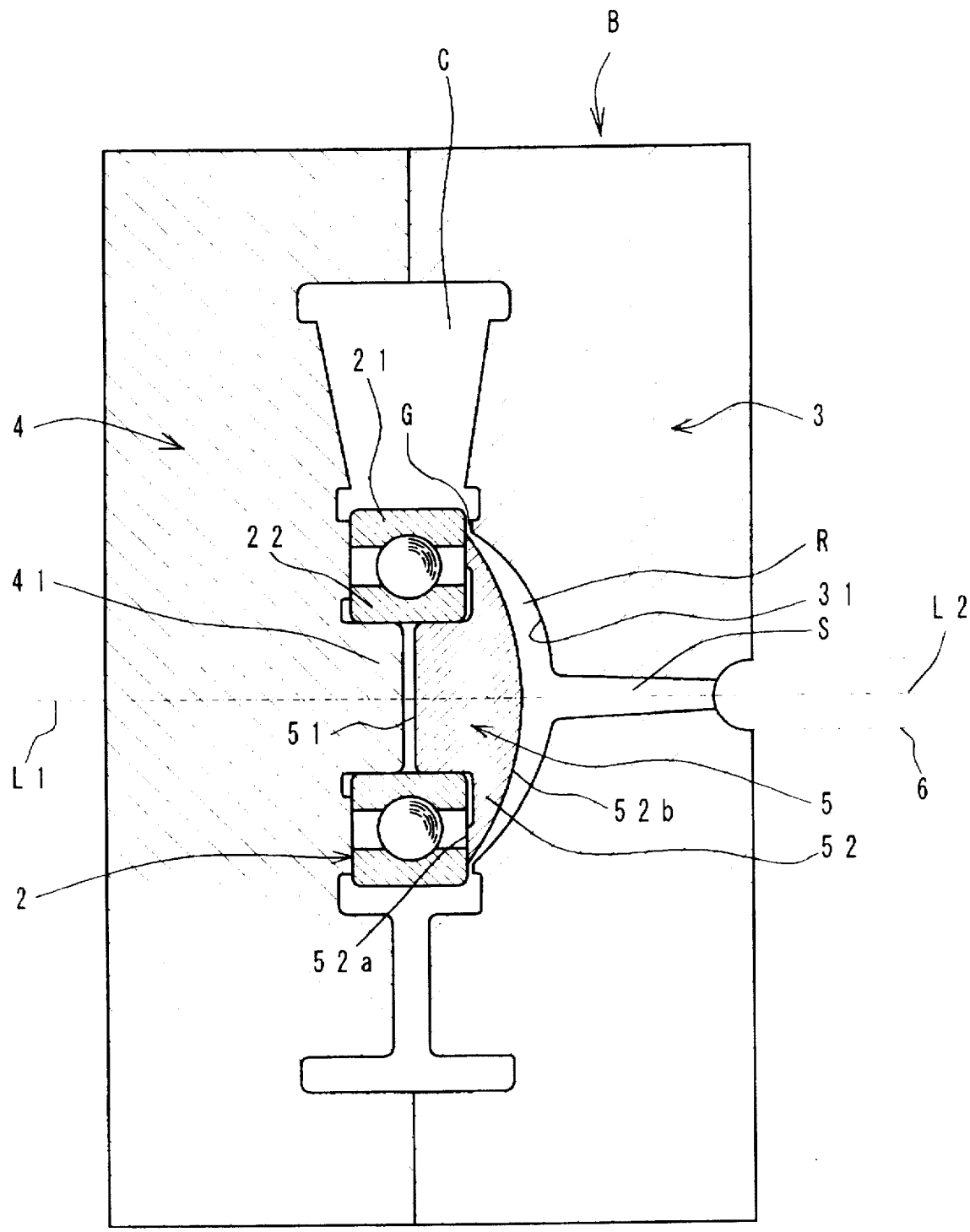
FIG. 1 is a section view of main portions of a molding apparatus used in the practice of a method of molding a resin-covered article according to the present invention.

FIG. 1 is a section view of main portions of the molding unit B of an injection molding apparatus to be used for embodying the present invention. This molding unit B comprises a pair of cavity molds 3, 4 forming a cavity C, a dummy boss shaft 5 disposed in the cavity C, and a nozzle 6 for injecting molten resin.

A spool S is disposed in one cavity mold 3 out of the pair of cavity molds 3, 4. The nozzle 6 is connected to the spool S. A concave portion 31 having a spherical surface is formed in the cavity mold 3 at the innermost part thereof which communicates with the spool S.

The dummy boss shaft 5 has a column-like shaft portion 51 to be fitted to the inner periphery of an inner ring 22 of the rolling bearing 2, and a flange 52 to be disposed along an end surface of the rolling bearing 2. The flange 52 has an outer diameter larger than the outer diameter of the shaft portion 51 and smaller than the outer diameter of the outer ring 21 of the rolling bearing 2. The flange 52 is provided at one lateral side thereof with a flat surface 52a at a right angle to the axis of the shaft portion 51. The flange 52 is provided at the other lateral side thereof with a spherical surface 52b. The outer peripheral edge of the flat surface 52a comes in close contact with the end surface of the outer ring 21 of the rolling bearing 2, such that the end surface of the rolling bearing 2 is hermetically sealed.

The dummy boss shaft 5 is disposed such that the axis L1 thereof is located on a virtual extension line of the axis L2 of the spool S and the nozzle 6. Thus, the flange 52 is disposed in the concave portion 31 of the cavity mold 3 with a predetermined gap provided therebetween. The gap between the spherical surface 52b of the flange 52 and the concave portion 31, is formed as a runner R which communicates with the spool S. The gap between the outer peripheral edge of the spherical surface 52b and the opening edge of the concave portion 31, is formed as an annular film gate G. In FIG. 1, the film gate G is formed as coming in contact with the outer periphery of the end surface of the outer ring 21 of the rolling bearing 2. The film gate G has an outer diameter smaller than the outer diameter of the outer ring 21.

To mold a resin pulley A with the molding unit B having the arrangement above-mentioned, the inner periphery of the inner ring 22 of the rolling bearing 2 is fitted to a core portion 41 of the cavity mold 4 with the molds opened. Then, the shaft portion 51 of the dummy boss shaft 5 is fitted to the inner periphery of the inner ring 22, and the flat surface 52a of the flange 52 is disposed along the end surface of the outer ring 21 of the rolling bearing 2. Then, the molds are closed and molten resin is injected through the nozzle 6. When introduced into the runner R through the spool S, the molten resin is concentrically spread and supplied into the cavity C through the annular film gate G. The dummy boss shaft 5 restrains the molten resin from entering the space defined by the inner periphery of the rolling bearing 2 and the gap between the inner ring 22 and the outer ring 21 thereof. Further, the dummy boss shaft 5 is adhered to the rolling bearing 2 by an injection pressure. This eliminates the need for disposing means for adhering the dummy boss shaft 5 to the rolling bearing 2.

Upon completion of molding, the molds are and opened and the and the rolling bearing 2 is pushed, at the end surface thereof for example, by an ejector pin (not shown) such that the resin pulley A together with the dummy boss shaft 5 is released from the cavity mold 4. It is noted that the dummy boss shaft 5 may repeatedly be used as removed from the resin pulley A thus released from the mold 4.

As discussed in the foregoing, when molding the resin pulley A, the cavity C is charged with molten resin through the annular film gate G. Accordingly, a gate mark is put on the resin body 1 in the form of an annular continuous stripe along the inner peripheral surface of the inner peripheral cylindrical portion 12. Thus, even though an internal stress acts on the gate mark due to a difference in thermal expansion between the rolling bearing 2 and the resin body 1, there is no possibility of the internal stress intensively acting on the specific gate mark portion. In the conventional point-like gate marks, the internal stress intensively acts on such gate marks. In the annular gate mark above-mentioned, however, the internal stress acts as dispersed on the gate mark portion in its entirety. This prevents the occurrence of a crack at the gate mark portion due to stress concentration.

Further, the film gate G is formed as coming in contact with the end surface of the outer ring 21 of the rolling bearing 2. Accordingly, the gate mark on the resin pulley A is put on the inner periphery of the resin body 1 at a position thereof which comes in contact with the end surface of the rolling bearing 2. Therefore, the position of the gate mark is shifted from the position where the rolling bearing 2 and the resin body 1 are relatively pressed due to a difference in thermal expansion between the rolling bearing 2 and the resin body 1. This makes it difficult that an internal stress generated in the resin body 1 due to a difference in thermal expansion, acts on the gate mark. This results in effective prevention of the occurrence of a crack at the gate mark portion even though the ambient temperature is low, i.e., even though the resin body 1 is great in low-temperature contraction.

Further, molten resin can be supplied into the cavity C from the side of the inner peripheral cylindrical portion 12 of the resin body 1 uniformly along the entire circumference thereof. Thus, the entire resin body 1 can uniformly be molded with high precision. In particular, since the resin supplied into the cavity C can smoothly flow, the roundness of the outer peripheral cylindrical portion 11 of the resin body 1 can be enhanced.

Figure 3:
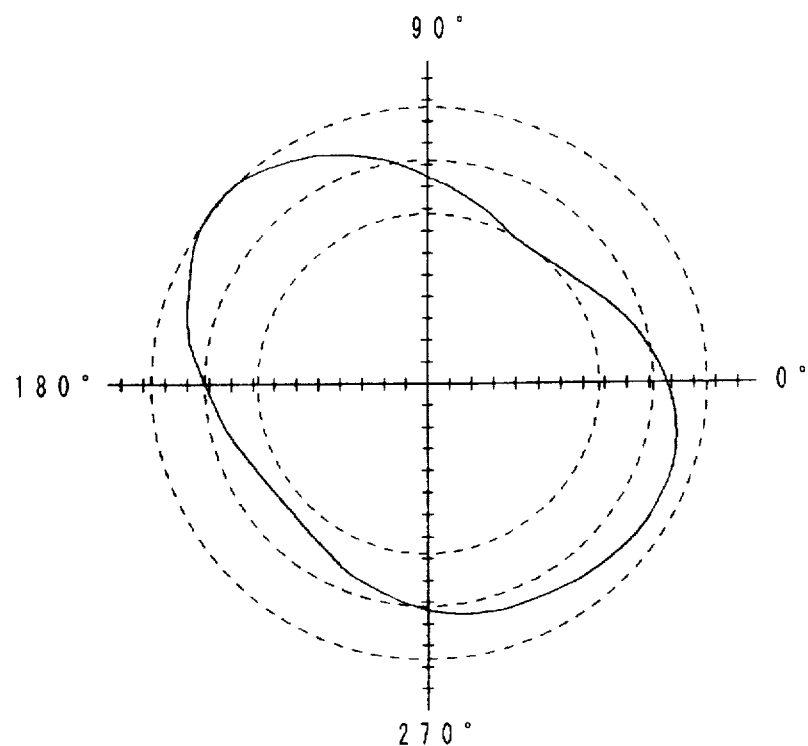
FIG. 3 is a graph showing the results of measurement of the roundness of a resin pulley molded by applying the present invention.
Figure 4:
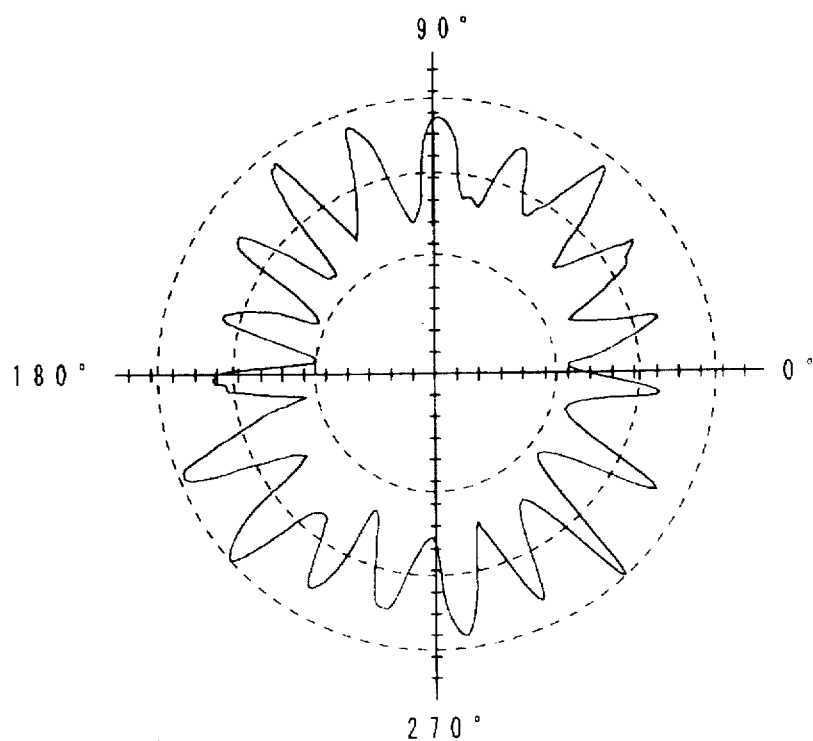
FIG. 4 is a graph showing the results of measurement of the roundness of a resin pulley molded by a conventional molding method.

FIG. 3 is a graph showing the results of measurement of the roundness of the outer peripheral surface of a resin pulley molded by the film gate method above-mentioned FIG. 4 is a graph showing the results of measurement of the roundness of the outer peripheral surface of a resin pulley molded by a conventional pin-point gate method. Each resin pulley subjected to the measurement was made of a nylon resin and had an outer diameter of 96φ. In the pinpoint gate method, the number of the gates was 19.

In FIGS. 3 and 4, the roundness of the resin pulley made by the film gate method was 40 μm, while the roundness of the resin pulley made by the pinpoint gate method was 100 μm. Thus, it can be understood that the film gate method considerably enhances the roundness as compared with the pinpoint gate method. Further, the pinpoint gate method produced a ripple including irregularities in number equal to the gate number, but the film gate method produced no such a ripple.

Further, the film gate method can restrain the internal stress from remaining in the inner peripheral cylindrical portion 12 of the resin body 1. This not only prevents the roundness of the rolling bearing 2 from being deteriorated, but also prevents the radial gap from being reduced.

Further, the axis L1 of the dummy boss shaft 5 is located on a virtual extension line of the axis L2 of the spool S and the injection molding nozzle 6, and molten resin can be guided into the film gate G along the spherical surface 52b of the flange 52 of the dummy boss shaft 5. Thus, the molten resin can be guided to the film gate G very smoothly. Therefore, the molten resin can further uniformly be supplied into the cavity C. As a result, the resin body 1 can further be uniformly molded with high precision in its entirety.

According to the molding method above-mentioned, the gate portion of the resin pulley A can be cut when the resin pulley A is released from the mold. Advantageously, this not only eliminates the need for a gate treatment, but also minimizes a wasteful resin at the spool S and the runner R.

Figure 5:
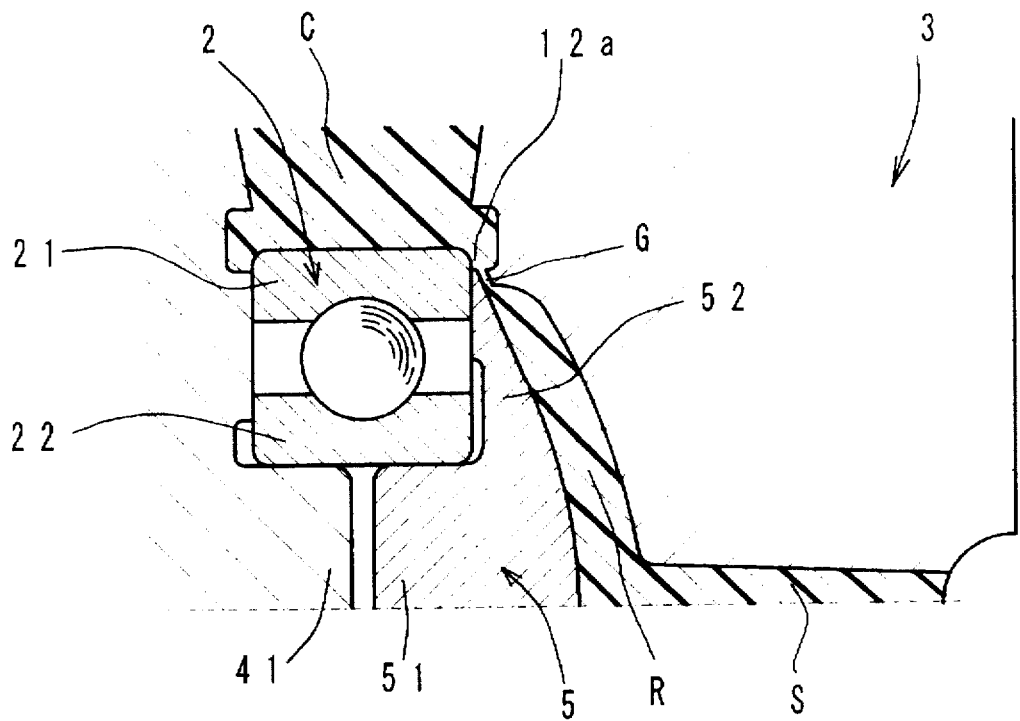
FIG. 5 is a section view of main portions of another example of the gate position.
Figure 6:
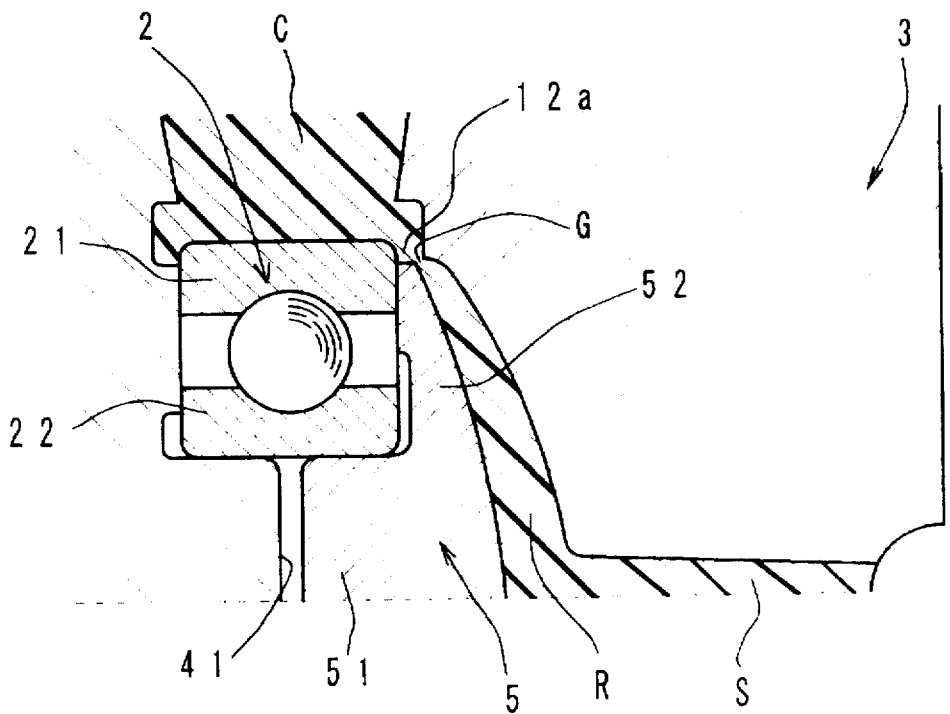
FIG. 6 is a section view of main portions of a further example of the gate position.
Figure 7:
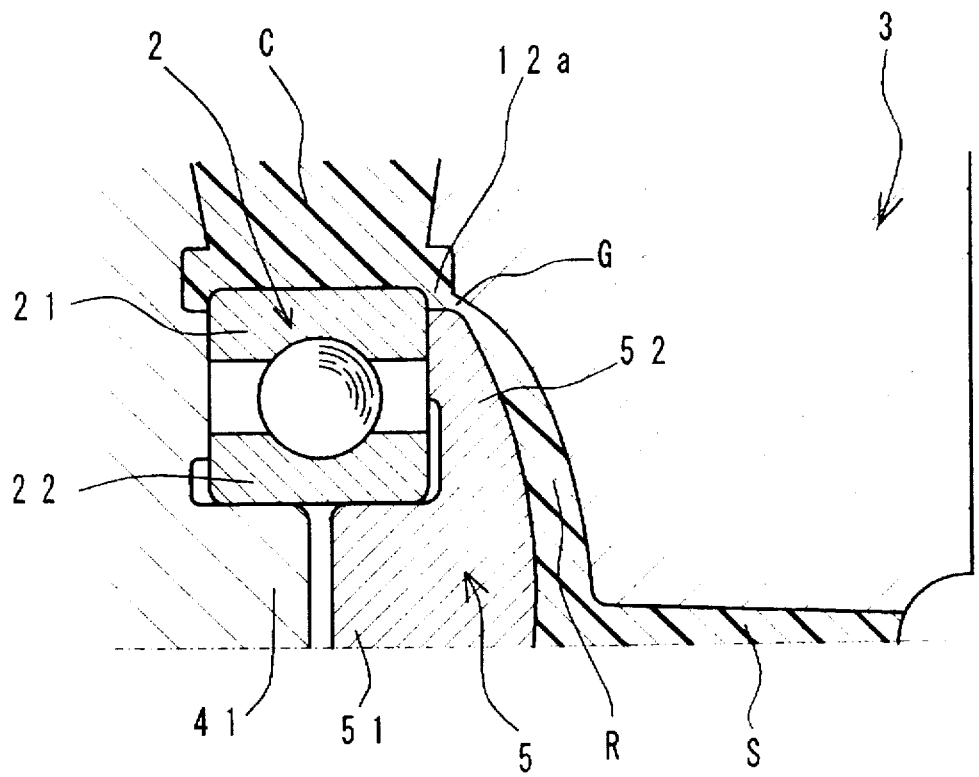
FIG. 7 is a section view of main portions of still another example of the gate position.

FIGS. 5, 6, 7 show the other examples of the film gate G. The film gate G in FIG. 1 is formed outside of the outer peripheral edge of the flange 52 of the dummy boss shaft 5 and between the end surface of the outer ring 21 of the rolling bearing 2 and the cavity mold 3. However, the film gate G in each of FIGS. 5 and 6 is formed between the outer periphery of the lateral side of the flange 52 and the cavity mold 3. The film gates G in FIGS. 5 and 6 are different in the following point. The film gate G in FIG. 5 is located in the inner peripheral cylindrical portion 12 of the resin body 1 at the intermediate portion of the inner peripheral surface of a flange 12a which covers a portion of the end surface of the outer ring 21. On the other hand, the film gate G in FIG. 6 is located at an end corner portion of the inner peripheral surface of the flange 12a. The film gate G in FIG. 7 is formed between the outer peripheral surface of the flange 52 of the dummy boss shaft 5 and the cavity mold 3 such that molten resin is axially injected into the cavity C.

Figure 8:
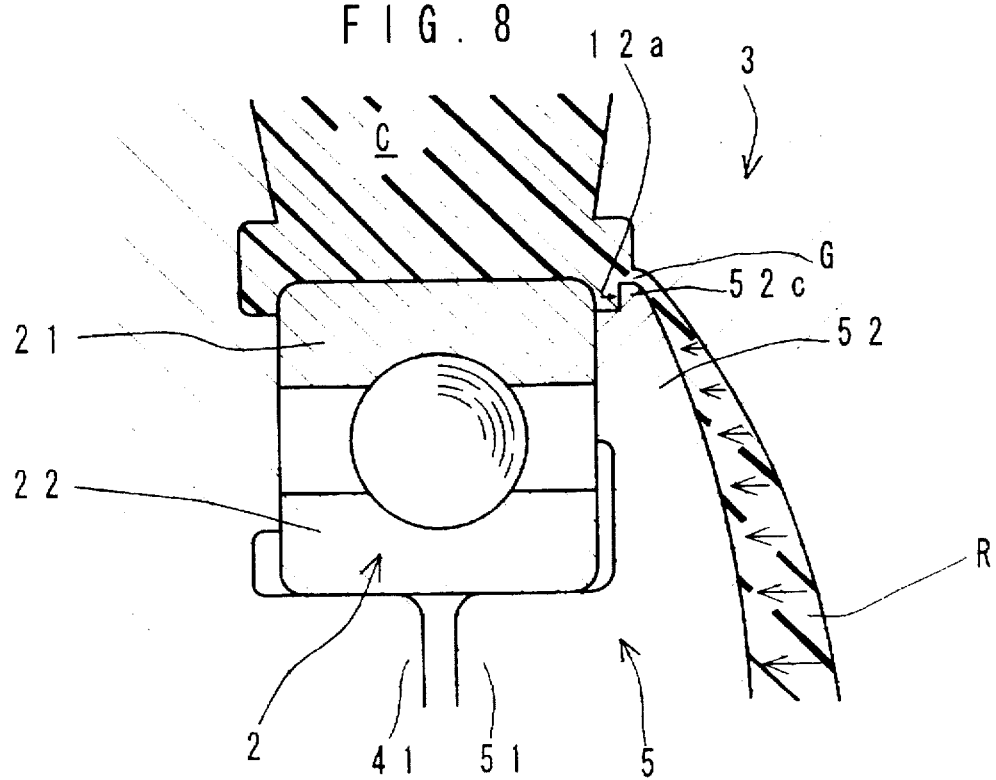
FIG. 8 is a section view of main portions of a comparative example of the gate position.

As far as the film gate G is formed at a position corresponding to the smallest-diameter portion of the cavity C to be charged with molten resin, no inconvenience occurs in molding. It is now supposed that, as shown in FIG. 8, a step portion 52c is formed at the outer periphery of the flange 52 of the dummy boss shaft and the film gate G is formed outside of the smallest-diameter portion of the flange 12a of the resin body 1. In this case, the injection pressure of molten resin acts on a lateral side of the step portion 52c of the dummy boss shaft 5 such that the flange 52 is liable to be separated from the outer ring 21. This forms a gap between the flange 52 and the outer ring 21, and molten resin flows in this gap. This fails to mold the resin body 1 in an accurate configuration. However, as far as the film gate G is formed at the position which corresponds to the smallest-diameter portion of the cavity C to be charged with molten resin or which corresponds to the smallest-inner-diameter portion of the resin body 1, the inconvenience above-mentioned does not occur.

Figure 9:
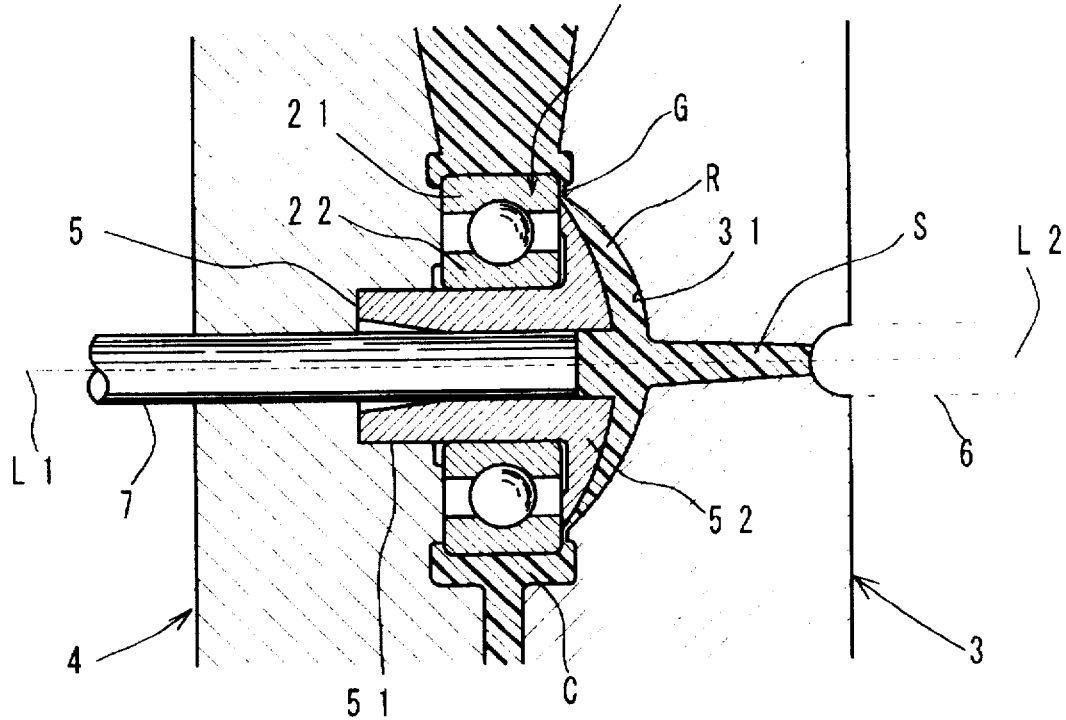
FIG. 9 is a section view of main portions of another embodiment of the present invention.
Figure 10:
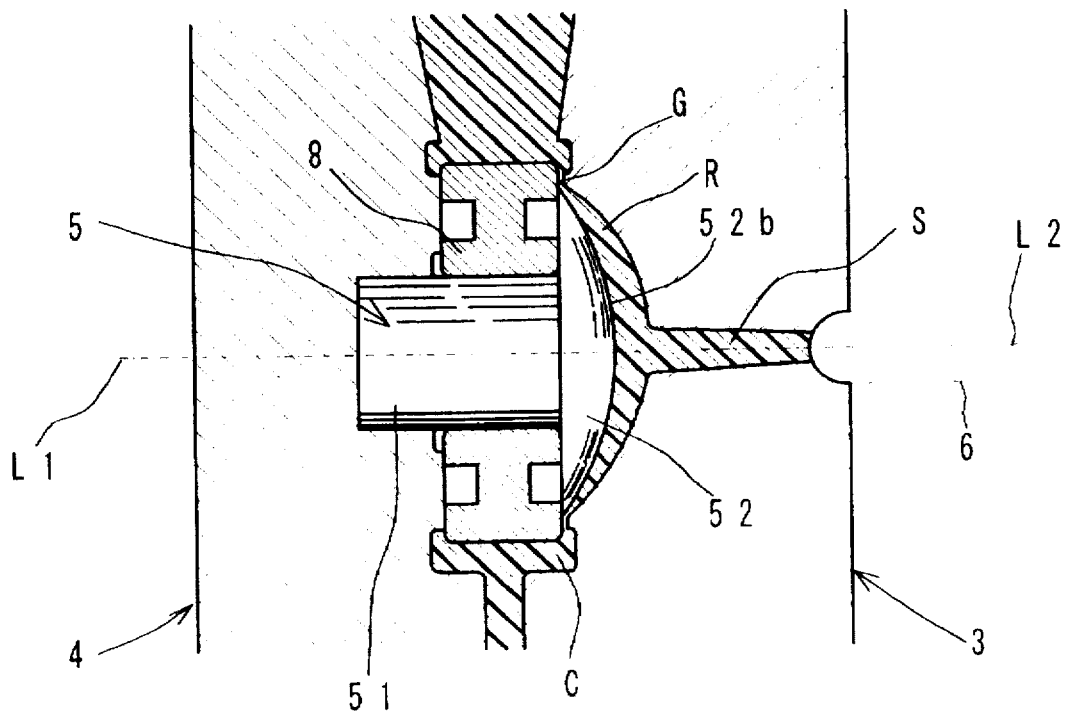
FIG. 10 is a section view of main portions of a further embodiment of the present invention.

The method of molding a resin-covered article of the present invention is not limited to the embodiment above-mentioned, but a variety of modifications may be made. For example, an ejector pin 7 may be disposed as passing through the center of the dummy boss shaft 5 and, together with the resin pulley A, the resin at each of the spool S and the runner R may be released from the mold (See FIG. 9). Further, another metallic member such as a metallic hub 8 or the like may be inserted instead of the rolling bearing 2 (See FIG. 10). Further, with the shaft portion 51 of the dummy boss shaft 5 fitted to the inner periphery of the metallic member, the dummy boss shaft 5 and the metallic member may be disposed in the cavity C.

Further, as the resin to be used in the practice of the present invention, a variety of synthetic resins may be used as far as they can be injection-molded. Instead of a synthetic resin, a synthetic rubber or the like may also be used.

Thus, the present invention may be embodied in other various forms without departing from the spirit or essential characteristics thereof. The embodiments above-mentioned are therefore considered in all respects as illustrative and the present invention is not to be construed in a restricted sense as limited to these specific embodiments.

What is claimed is:

1. A method of molding a resin pulley, comprising the steps of:

(a) providing first and second cavity molds, each of the cavity molds having an inside and a center, the cavity molds forming a cavity in a closed position;

(b) providing a rolling bearing having an inner ring and an outer ring, the inner ring having an inner peripheral surface, and the outer ring having an end surface, an outer peripheral surface, and an outer diameter;

(c) providing a dummy boss shaft having a shaft portion and a flange formed adjacent the shaft portion, the shaft portion being dimensioned to be fitted to the inner peripheral surface of the inner ring, and the flange having a lateral side at a right angle to an axis of the shaft portion and an outer diameter smaller than the outer diameter of the outer ring;

(d) disposing the first and second cavity molds in an open position;

(e) disposing the rolling bearing at the inside and center of the first cavity mold;

(f) removably fitting the shaft portion of the dummy boss shaft into the inner ring of the rolling bearing with the lateral side of the flange contacting the end surface of the outer ring of the rolling bearing so as to leave an annular margin between the outer diameter of the flange and the outer diameter of the end surface of the outer ring;

(g) closing the first and second cavity molds following said steps (e) and (f), thereby forming a cavity extending around a portion of the outer ring adjacent the outer peripheral surface of the outer ring, the cavity having a portion of smallest diameter which is to be charged with molten resin, and also forming a film gate along the portion of the adjacent the outer peripheral surface of the outer ring at a position corresponding to the smallest inner diameter portion of the annular cavity;

(h) supplying molten resin into the cavity through the film gate to mold an annular resin body around the rolling bearing to form a resin pulley, with the annular resin body having a flange covering the portion of the outer ring adjacent the outer peripheral surface of the outer ring, so as to connect the outer ring of the rolling bearing integrally with the resin body, the flange of the annular resin body having a smallest inner diameter portion corresponding to the smallest inner diameter of the annular cavity, and wherein the molten resin injected through the film gate does not enter the space between the flange of the dummy boss shaft and the end surface of the outer ring of the rolling bearing due to the location of the film gate at a position which corresponds to the smallest inner diameter portion of the flange of the resin body;

(i) opening the cavity molds following said step (h);

(j) removing the resin pulley and the dummy boss shaft from the cavity molds following said step (I); and (k) removing the dummy boss shaft from the resin pulley following said step (j).

2. The method of claim 1, wherein one of the molds includes a spool in communication with the film gate, for connection to an injection molding nozzle, the spool and the injection molding nozzle having collinear axes, and wherein the dummy boss shaft has an axis, and wherein in said step (g), when the first and second cavity molds are closed, the dummy boss shaft is positioned so that its axis is located on a virtual extension line of the axes of the spool and the injection molding nozzle.

3. The method of claim 1, wherein the flange of the dummy boss shaft has a spherical surface facing away from the shaft portion, and wherein in said step (h), the molten resin is guided to the film gate along the spherical surface of the flange.

4. The method of claim 1, wherein said step (e) follows said step (f), and wherein in said step (e) the rolling bearing and the dummy boss shalt fitted therein are disposed together in the first cavity mold.

5. The method of claim 1, wherein said step (f) follows said step (e).

* * * * *